United States Patent
Jaffri et al.

(10) Patent No.: US 9,389,299 B2
(45) Date of Patent: Jul. 12, 2016

(54) MOBILE COMMUNICATION DEVICE MAINTAINING LIFETRAILS IN A BATTERY EFFICIENT MANNER

(75) Inventors: Taqi Jaffri, Seattle, WA (US); Omar Aftab, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 396 days.

(21) Appl. No.: 13/163,939

(22) Filed: Jun. 20, 2011

(65) Prior Publication Data

US 2012/0322459 A1    Dec. 20, 2012

(51) Int. Cl.
*H04W 24/00*    (2009.01)
*G01S 5/00*    (2006.01)
*G01S 1/68*    (2006.01)

(52) U.S. Cl.
CPC ...... *G01S 5/0018* (2013.01); *G01S 1/68* (2013.01)

(58) Field of Classification Search
None
See application file for complete search history.

(56) References Cited

U.S. PATENT DOCUMENTS

| | | |
|---|---|---|
| 7,414,988 B2 | 8/2008 | Jones et al. |
| 7,471,954 B2 | 12/2008 | Brachet et al. |
| 7,515,917 B2 | 4/2009 | Casey |
| 2002/0184331 A1 | 12/2002 | Blight et al. |
| 2004/0043767 A1 | 3/2004 | Tsutsumi et al. |
| 2006/0039450 A1 | 2/2006 | Fulton et al. |
| 2007/0133352 A1 | 6/2007 | Kim et al. |
| 2008/0013487 A1 | 1/2008 | Molteni et al. |
| 2008/0132251 A1 | 6/2008 | Altman et al. |
| 2008/0248813 A1* | 10/2008 | Chatterjee ................. 455/456.2 |
| 2009/0005080 A1 | 1/2009 | Forstall et al. |
| 2011/0018732 A1* | 1/2011 | Cho et al. ................. 340/825.49 |
| 2011/0034179 A1* | 2/2011 | David et al. ................. 455/456.1 |
| 2011/0051665 A1* | 3/2011 | Huang .......................... 370/328 |
| 2011/0143785 A1* | 6/2011 | Cohen et al. .................. 455/466 |
| 2012/0200457 A1* | 8/2012 | Farrokhi et al. .......... 342/357.29 |

OTHER PUBLICATIONS

Struys, et al., "Creating Location-Aware Applications for Windows Mobile Devices", Retrieved at<< http://msdn.microsoft.com/en-us/library/dd938890%28loband%29.aspx >>, Jun. 2009, pp. 8.

(Continued)

*Primary Examiner* — Justin Lee
(74) *Attorney, Agent, or Firm* — Judy Yee; Micky Minhas (57) ABSTRACT

A method is used to develop and maintain a user's lifetrail, which is a historical record specifying the location of the user while in possession of a mobile communication device. A mobile device determines its current location by extracting a beacon ID from a signal source and transmitting it to a remotely-located server, which accesses a look-up table to find the corresponding location of the signal source represented by the beacon ID. The location may be specified in accordance with a spatial compression technique. The server transmits the signal source location back to the mobile device so that the mobile device knows that it is located within the coverage area of the signal source. Battery power is conserved by collecting the beacon IDs when it is receiving the beacon signals for some other purpose and not necessarily solely for the purpose of determining its current location. Battery power can be further conserved by deferring the resolution of the beacon IDs so that they are not necessarily associated with their corresponding location when they are received, but only at some later convenient time. In some cases resolution of the beacon IDs may be performed using social graph data received from a social network.

15 Claims, 4 Drawing Sheets

(56) References Cited

OTHER PUBLICATIONS

Ravi, et al., "Context-aware Battery Management for Mobile Phones: A Feasibility Study", Retrieved at<< http://reality.media.mit.edu/pdfs/Ravi.pdf >>, Retrieved Date: Mar. 1, 2011, pp. 16.

Shasteen, Mark A., "New and Emerging Energy Efficient Wireless Protocols", Retrieved at << http://www1.cse.wustl.edu/~jain/cse574-08/ftp/energy/index.html >>, Retrieved Date: Mar. 1, 2011, pp. 13.

International Search Report and Written Opinion issued Dec. 26, 2012 in connection with corresponding PCT application No. PCT/US2012/042787 (9 pages total).

LaMarca, Anthony, et al., "Place Lab: Device Positioning Using Radio Beacons in the Wild", Copyright 2004, Intel Corporation, Oct. 2004, 20 pages.

* cited by examiner

MOBILE COMMUNICATION DEVICE MAINTAINING LIFETRAILS IN A BATTERY EFFICIENT MANNER

BACKGROUND

In recent years the number of mobile computing devices has increased dramatically, creating a demand for more advanced mobile and wireless services. Mobile e-mail, mobile social media services, multi-player gaming and call-following are examples of how new applications are emerging on mobile devices. In addition, users are beginning to seek applications that not only utilize their current location but also share that location information with others. Parents wish to keep track of their children, supervisors wish to track the location of the company's delivery vehicles, and a business traveler looks to find the nearest pharmacy to pick up a prescription. All of these examples require the individual to know their own current location or that of someone else.

Location-based services are an emerging area of mobile applications which leverage the ability of new devices to calculate their current geographic position and report that to a user or to a service. Some examples of these services include local weather, traffic updates, driving directions, child trackers, buddy finders and urban concierge services. To be able to provide such services mobile devices are more and more incorporating positioning technology. For instance, mobile devices may be equipped with Global Positioning System (GPS) receivers, which receive radio signals from dozens of orbiting satellites that are used as reference points. The receivers measure the time it takes for the signals to reach the receiver. After receiving signals from three or more GPS satellites the receiver can triangulate its position on the globe.

Despite the growth in positioning technologies, problems remain. For instance, it is difficult for a mobile device to remain continuously aware of its location. GPS receivers, for example, do not work where people spend most of their time; coverage in current systems is generally constrained to outdoor environments. In addition, GPS, as well as other positioning technologies such as cell tower triangulation and Wi-Fi location systems, are not sufficiently battery efficient to be used continuously.

SUMMARY

A method and system is provided to develop and maintain a user's lifetrail, which is a historical record specifying the location of the user while in possession of a mobile communication device. Importantly, the lifetrail is developed in a battery efficient manner. A mobile device can determine its current location by extracting the beacon ID from a signal source and transmitting it to a remotely-located server. A lifetrail engine associated with the server receives beacon ID from the mobile device and accesses a look-up table or the like in a database to find the corresponding location of the signal source represented by the beacon ID. The server may then transmit the signal source location back to the mobile device so that the mobile device knows that it is located within the coverage area of the signal source. In one implementation, battery power is conserved by collecting the beacon IDs opportunistically. In other words, the mobile device may collect the beacon IDs when it is receiving the beacon signals for some other purpose and not necessarily solely for the purpose of determining its current location.

In addition to collecting the beacon IDs opportunistically, in some implementations battery power is further conserved by deferring the resolution of the beacon IDs so that they are not necessarily associated with their corresponding location when they are received, but only at some later convenient time. That is, the annotation of beacon IDs with location information is deferred and performed in such a way as to minimize the use of battery power. For instance, beacon IDs may be uploaded to the server in batches, either after a certain number have been locally stored in the mobile device, after the storage space needed to store them exceeds a certain size or after a certain amount of time has elapsed. In addition, or alternatively, the beacon IDs may be uploaded whenever the mobile device is connected to an external power source or is synchronized with a personal computer or other device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In addition to determining a user's current location, a user of a mobile communication device may wish to maintain a history of where he or she has been while in possession of the mobile communication device over a period of days, weeks months and even years. Such a historical record of location information is referred to herein as the user's lifetrail. Lifetrails may be used to provide a variety of different services to a user. For example, if a service has knowledge of where a user spends time on a recurring basis, the service can develop a list of the user's favorite places. If, for instance, the service determines that a user frequents coffee shops on a regular basis, the service may infer that the user likes coffee. In this event the service may send the user a coupon. More generally, a service may use a lifetrail to develop a heat map of a user's location over a period of time. The heat map can be used to deliver various types of information such as advertisements or the like to the user based on his or her most frequented locations. Applications residing on the user's mobile device may also make use of a lifetrail. In one example, if a lifetrail indicates that three people reside in the same house or work in the same office, a contacts application on one of their mobile devices may suggest that the other two mobile devices be added to a quick access list maintained by the contact application. As another simple example, a user may make use of a lifetrail to find a lost object such as a set of keys. For instance, the user could backtrack to the place where he or she last remembers seeing the keys, and from that location follow their lifetrail to go to those places subsequently visited.

One straightforward way to create a user's lifetrail is to continuously record the location data provided by a GPS system that may be incorporated into the mobile device. One problem with this approach is that it requires a mobile device that includes a GPS system. Although such devices are becoming more commonplace, other problems make this approach impractical. In particular, GPS systems, as well as other location techniques, are not particularly battery efficient and may consume the available power in a relatively short period of time, thereby making their continuous use problematic.

To overcome this problem, a method is provided for developing a lifetrail in a power conserving manner. As detailed below, this method defers the resolution of signals which are opportunistically observed or detected by the mobile device.

Figure 1:
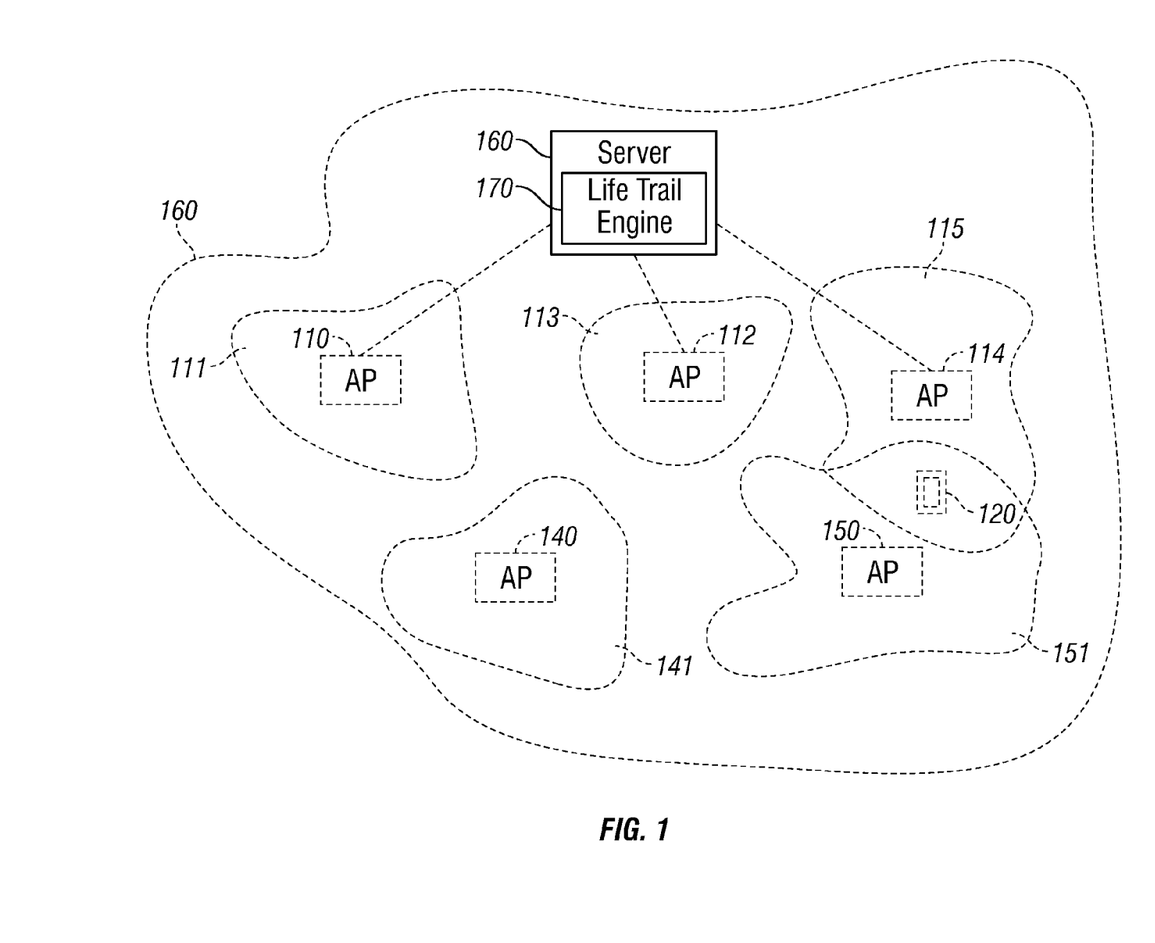
FIG. 1 shows one example of an operating environment in which the processes described herein for creating lifetrails may be implemented.

FIG. 1 shows one example of an operating environment in which the processes described herein for creating lifetrails may be implemented. Environment 100 includes a plurality of wirelessly accessible devices, including, but not limited to access points 110, 112 and 114. Each of the access points 110, 112 and 114 have a coverage region 111, 113, and 115 associated respectively therewith. Coverage areas 211, 213 and 215 are areas in which a device, such as a mobile communication device 120 equipped with a wireless transceiver can establish wireless communication with the access point. In some cases the coverage area of two or more access points may overlap with one another.

The wireless transceiver incorporated into the mobile communication device 120 may be a transceiver, such as but not limited to an IEEE 802.11 transceiver, a Bluetooth transceiver, a cellular transceiver, and so on. The wireless network that is established, and the size of the coverage region associated therewith, will depend on the particular technology employed by the access point. For instance, examples of wireless networks may include a wireless wide area network (WWAN), a wireless local area network (WLAN) and a wireless personal area network (WPAN).

It should be noted that while in the examples presented herein the mobile communication device 120 is said to wirelessly communicate with an access point such as access points 110, 112 and 114, more generally the mobile communication device may wirelessly communicate with any signal source that can be used to establish communication with a wireless network, regardless of the technology employed. Accordingly, in the examples that follow reference to access points is by way of illustration only and the methods, techniques and systems described herein are equally applicable to other signal sources.

Illustrative technologies that may be employed to establish the aforementioned wireless networks include the following. Of course, these technologies are presented by way of illustration only and, more generally other technology platforms, may be used as well. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A WLAN may operate in accordance with an IEEE 802.11x protocol, and a WPAN may operate in accordance with a Bluetooth, IEEE 802.15x, or Near-Field Communication (NFC) protocol, for example. The methods and techniques shown herein may also be used for any combination of WWAN, WLAN and/or WPAN.

Figure 2:
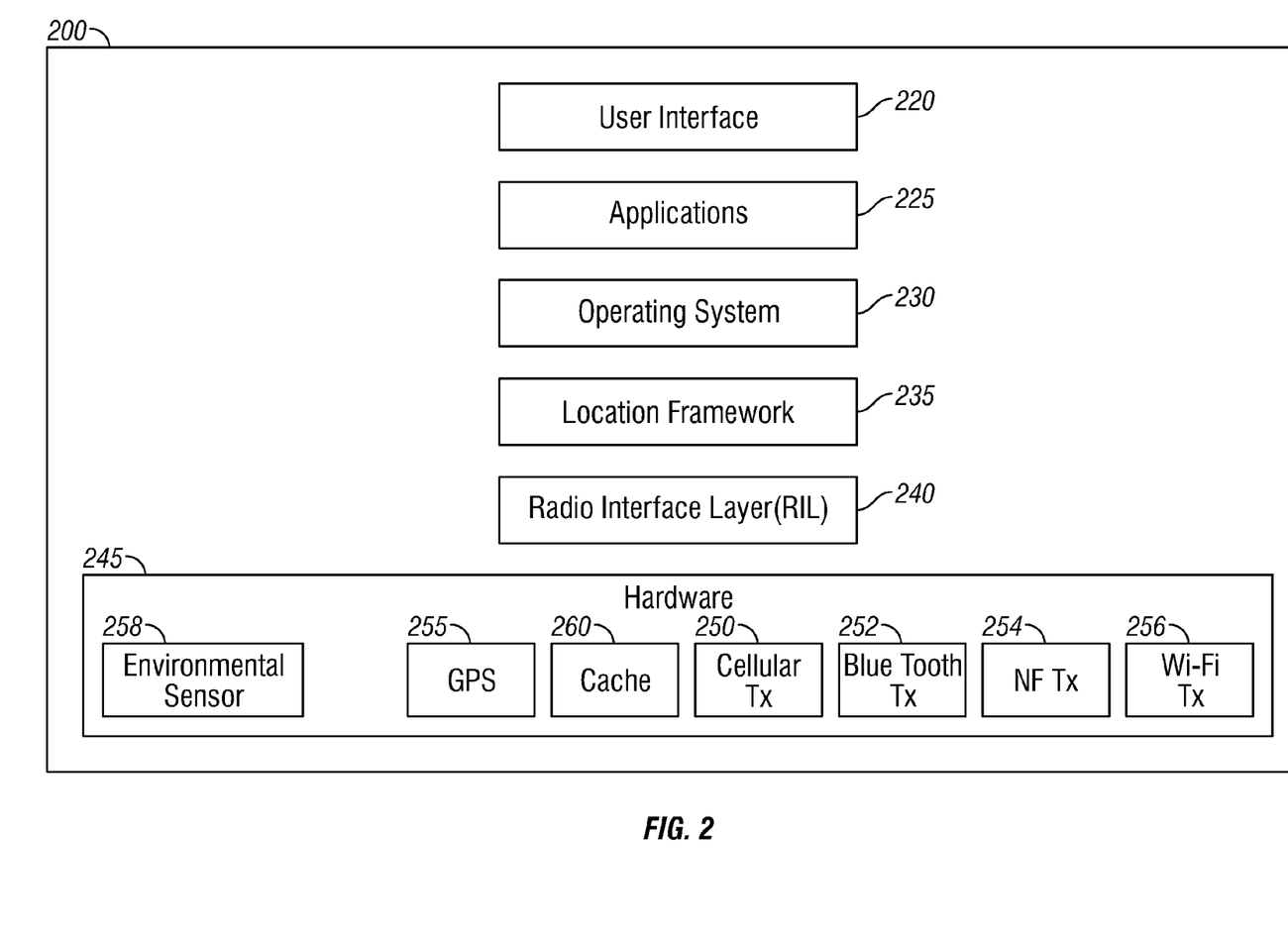
FIG. 2 shows one particular illustrative architecture of the major functional components of a mobile communications device such as depicted in FIG. 1.

FIG. 2 shows one particular illustrative architecture 200 of the major functional components of a mobile communications device such as depicted in FIG. 1. Although the architecture 200 shown in FIG. 2 is particularly adapted for a mobile phone, the fundamental principles it illustrates can be expected to have general applicability to other platforms such as, for example, a laptop PC, a netbook, a tablet or the like. In this exemplary embodiment, a UI 220 is provided by the architecture 200 to support user interactivity and facilitate an effective user experience, and will typically be embodied as a graphical user interface. A variety of applications reside on the mobile communication device, which applications are collectively indicated by reference number 225. Some applications that reside on the mobile communication device may offer location-based services which require the mobile communication device to determine its location as well as a history of locations previously visited. Such location-based services may integrate a mobile device's current or historical location or position with other information so as to provide added value to a user. Examples of such applications include map applications, traffic alert applications, geo-tagging applications (to e.g., tag a recorded image with its location) and other applications that identify for the user nearby points-of-interest (e.g. restaurants, stores).

Supporting the applications 225 in the architecture 200 are an operating system 230, a location framework layer 235, a radio interface (RIL) layer 240 and a hardware layer 235. In this exemplary embodiment, the operating system 230 is particularly adapted to operate on a resource-limited device and may comprise, for example, Android. The location framework layer 235 provides logic and control functions that capture the location information obtained from the hardware layer 245 and makes it available to any of the applications 225 that require it. The RIL layer 240 is a set of APIs providing a level of abstraction between the radio on a mobile phone and the software of the mobile phone. That is, the RIL layer 240 serves as a hardware adaptation layer, i.e., a layer that isolates the specifics of a particular mobile system/hardware from the bulk of the software system. In this way various software solutions may be adaptable to multiple different mobile systems and radios.

The hardware layer 235 provides an abstraction of the physical hardware implemented on the mobile communication device and will typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and non-removable media such as magnetic and optical media, solid-state memory, and other conventional media. The aforementioned physical hardware components are not illustrated in layer 235 since they are not pertinent to the present discussion. However, the following hardware components are depicted in FIG. 2 since they are pertinent to the discussion that follows.

In particular, the hardware layer 235 of the mobile communication device includes one or more wireless transceivers. In this implementation mobile communication device 200 includes a cellular radio transceiver 250, a Bluetooth transceiver 252, and NFC transceiver 254 and a Wi-Fi transceiver 256. The mobile communication device 200 may also optionally include a GPS receiver 255 and a cache 260. The wireless transceivers allow the mobile communication device to communicate over wireless networks. The radio 250 includes such conventional components as a transmitter, receiver, antenna and so on. If present, the GPS positioning circuit 255 receives signals through a GPS antenna from a GPS satellite navigation system for determining the location of the mobile communication device. Among other things, the cache 260 may be used to store cellular base station IDs (BSIDs) and their corresponding location information pertaining to various cellular base stations that the mobile device has been in communication with. Thus, the cache 260 may include a subset of the information located in the backend database 130 shown in FIG. 1. In this way the mobile communication device does not need to exchange messages with the backend database 130 each and every time it wants to obtain location information regarding a base station.

Also shown as part of the hardware layer 245 in the mobile communication device 200 of FIG. 2 is one or more optional environmental sensors 258. Such sensors may be used to capture the value of various environmental parameters such as ambient temperature, ambient light levels and ambient sound.

Referring again to FIG. 1, mobile communication device 120 can communicate with a server 160 over a communication network such as the Internet or other public and/or private network (e.g., an intranet) via one or more of the access points (APs) 110, 112, and 114. Server 160 includes a lifetrail engine 170, which creates and maintains a database of lifetrails for users of mobile devices such as mobile device 120.

Each of the APs 110, 112 and 114 transmit radio beacons, which wireless devices use to establish communication with the APs. While the format and other details of the beacons will depend on the technology platform and protocol that is employed, these beacons all have unique or semi-unique IDs such as a MAC address, for example, in the case a Wi-Fi access point and a base station ID, as another example, which is included in a systems parameter message (SPM), which is a part of a beacon generated by an access point in a CDMA cellular network.

In the case of Wi-Fi, a mobile device can receive beacons in an entirely passive manner by listening for beacon frames periodically sent by the access point. These beacon frames are sent in the clear and are not affected by either WEP or MAC address authentication. Other technologies like Bluetooth require the mobile device to initiate a scan in order to find nearby beacons.

Mobile devices can determine their current location by extracting the beacon ID from one or more beacons that are currently being received and transmitting them to server 260. Server 260 includes a lifetrail engine 170 for building and maintaining a database that associates beacon IDs (each representing an access point or other signal source) with their respective locations. Upon receiving a beacon ID from a mobile device, the lifetrail engine 170 may access a look-up table or the like in a database to find the corresponding location of the access point or other signal source represented by the beacon ID. The server 260 may then transmit the access point location back to the mobile device. In turn, the location of the mobile device may be determined as being within the coverage area of the access point. When the mobile device changes location so that it begins to communicate with a different access point, the received beacon signal may change accordingly. The new beacon signal may include a new beacon ID, which can be sent to the server so that the location of the access point identified by the new beacon ID can be resolved. In this way the mobile devices may determine its location as being within the coverage area of the new access point.

The lifetrail engine 170 may create a lifetrail for a mobile device using the information in the database 170. In particular, as a mobile device moves from location to location, it may come within range of various access points and receive their respective beacon signals. The mobile device can extract the beacon IDs from the beacon signals and store them in a local memory or cache along with a timestamp specifying when they were received. The beacon IDs can be sent to the server 160 at a later time.

In order to conserve the mobile device's battery power, the mobile device may collect the beacon IDs opportunistically. In other words, the mobile device may collect the beacon IDs when it is receiving the beacon signals for some other purpose, such as to gain access to a network served by the access point identified by that ID. That is, the mobile device does not necessarily collect the beacon IDs solely for the purpose of determining its current location, but only when it is extracting that information from a beacon signal for other purposes. For instance, as noted, if the access point or other signal source is a Wi-Fi access point, the beacon may be received passively whenever it is within range of a Wi-Fi access point, whereas a Bluetooth access point requires the mobile device to initiate a scan in order to find nearby beacons. Accordingly, if beacon IDs are collected opportunistically, a mobile device can record the beacon ID from a Wi-Fi access point whenever it is received, whereas the beacon signal from a Bluetooth access point will only be recorded when a user attempts to establish communication with a Bluetooth-enabled device or network.

To further conserve battery power, the beacon IDs are not necessarily resolved so that they are associated with their corresponding location when they are received, but only at some later convenient time. For instance, the time at which the beacon IDs are resolved may be selected to optimize the conservation of battery power. That is, the annotation of beacon IDs with location information may be deferred and performed opportunistically. For instance, beacon IDs may be uploaded to the server in batches, either after a certain number have been locally stored in the mobile device, after the storage space needed to store them exceeds a certain size or after the a certain amount of time has elapsed. In addition, or alternatively, the beacon IDs may be uploaded whenever the mobile device is connected to an external power source or is synchronized with a personal computer or other device. Of course, the time at which the beacon IDs are uploaded to the server may be determined in any number of different ways, depending on the circumstances.

Figure 3:
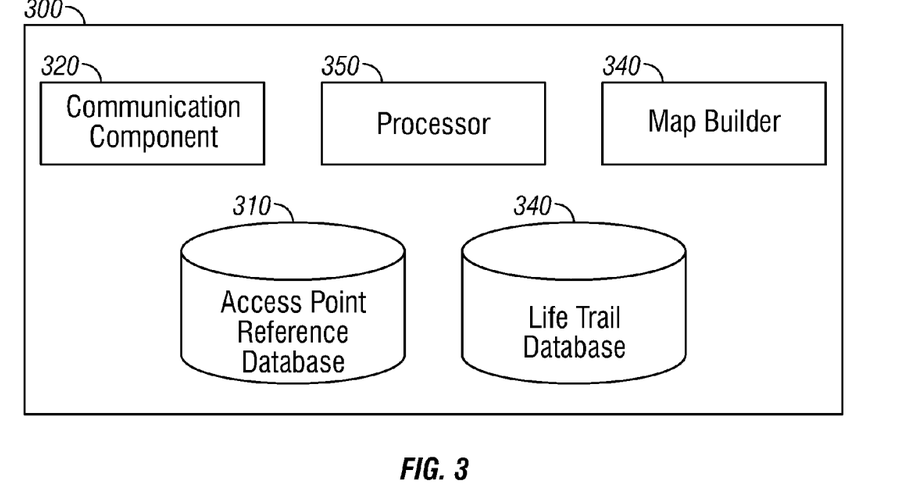
FIG. 3 shows the high level logical architecture of one example of a lifetrail engine.

One example of the lifetrail engine 170 is described in more detail with reference to the high level logical architecture shown in FIG. 3. Lifetrail engine 300 includes a communication component 320, processor 350, access point reference database 310 (or more generally, a signal source reference database), lifetrail database 330 and map builder 340.

The communication component 320 receives the beacon IDs from the mobile devices and, under control of computer-implemented logic in processor 350, checks each of them against the data in the access point reference database 310. The communication component 320 may receive the beacon IDs directly from a communication network or they may be forwarded to the communication component 320 from a front-end module of the server 170 with which it is associated. The access point reference database 310 returns the location data for each of the beacon IDs that are known to the system. Processor 350 causes this information, along with the timestamp designating the time at which the beacon ID was recorded by the mobile device and the ID of the mobile device which supplied the beacon ID, to be passed to lifetrail database 330. In this way the lifetrail database 330 can build and maintain a lifetrail for each mobile communication device.

If a mobile device sends a beacon ID to the lifetrail engine that is not included in the access point reference database 310, the beacon ID is added to it and to the lifetrail associated with that mobile device in lifetrail database 330. If at some later time the lifetrail engine is provided with its location information, both the access point reference database 310 and the lifetrail database 330 can be updated accordingly.

The lifetrail engine 300 may contain additional components to process and analyze the data stored in the lifetrail database 330. As one example, the lifetrail engine 300 in FIG. 2 shows a map builder 340, which is used to construct and display a map indicating those location most frequently visited by a mobile communication device user.

The map builder 340 may also be used to construct and display on the user's device other types of heat maps to track a user's various activities. For instance, heat maps may be constructed which show the frequency with which the user makes voice calls from various locations. Similarly, heat maps may be constructed which show the frequency with which the user sends text messages, takes photos or uses a particular application while at various locations. In yet another example, heat maps may be constructed which show when any of the aforementioned activities take place. These heat maps may be used in conjunction with one another to develop a usage profile for the user which shows how he or she typically uses the mobile communication device. For instance, the heat maps may show that a particular user typically makes phone calls between 5 and 6 pm while driving home, with 80% of the calls being to his wife at about 5 pm and 20% being to his best friend, and with the majority of the calls being made from Highway ABC.

Lifetrail engine 300 may build access point reference database 310 by gathering information from a variety of different sources. For instance, beacon ID and access point location data may be self-reported by the access point provider, operator or user. The data may also be obtained using a manual process in which a device scans for beacon signals and locates them using, for example, a GPS location technique, an assisted GPS location technique and an access point (e.g., cell tower) triangulation technique. A mobile communication device that employs the methods and techniques described herein may also gather information to build, supplement or update the data in access point reference database 310. For instance, if the mobile device is equipped with a GPS, in addition to reporting the beacon ID, the mobile device may also report its location so that it can be incorporated into the access point reference database 310 when this information is otherwise unknown to it. In this way the database can updated with location information on an ongoing basis.

Yet other sources of location information that the lifetrail engine may use to annotate both a user's lifetrail and a beacon ID with location information are social networks. In this implementation the lifetrail engine is informed of those social networks to which the user belongs, and this information is associated with the user's lifetrail. In this way the lifetrail engine can use information obtained from the user's social graph, which maps a first individual to other individuals to which the first individual is directly or indirectly connected through one or more social networks.

The manner in which social networks and graphs may be used to obtain location information can be illustrated by an example. Assume that a first user has reported that his or her mobile device has received a certain beacon ID on a particular day and time, but that the location of the access point identified by this beacon ID is unknown to the lifetrail engine. Also assume that a second user has reported his location on that particular day and time to the lifetrail engine. Moreover, the second user has also taken a photograph on that particular day and time which includes user 1, and that user 2 has tagged this photograph with data that includes the name of user 1. User 2 also puts this photograph on his social networking site, which is one of the sites that user 1 has registered with the lifetrail engine. Since the lifetrail engine knows where user 2 was on that particular day and time, and, via the social graph of user 2, the lifetrail engine knows that user 2 was with user 1 at that particular time, the lifetrail engine can conclude that the user 1 was at the same location as user 2 and thus can annotate the beacon ID and the lifetrail of user 1 with this location information. Of course, the item that is tagged by user 2 to identify user 1 need not be a photograph. More generally, a user's location may be obtained in a wide variety of ways using social networks and the user's social graphs.

In some implementations additional techniques may be employed to build lifetrails without excessive power consumption. For instance, spatial compression may be used to reduce the relatively data intensive process that is needed if location information is specified in terms of precise geographic coordinates such as latitude and longitude. Spatial compression reduces the amount of data that needs to be communicated by dividing regions (or even the entire Earth's surface) into grids and then only storing in the lifetrail engine 320 and the mobile device the grid in which the access points are located. While this may only provide to the user an approximate location, it reduces the amount of data that needs to be sent by the server 160 to the mobile communication device.

Another technique that may be employed to conserve battery employs edge based beacon clustering to reduce the number of beacon IDs that the mobile device (the edge device) reports to the lifetrail engine. With beacon clustering, a mobile device does not report every access point or other signal source from which it receives a beacon signal. Rather, it may report only a subset of those access points to the lifetrail engine. For instance, in any given location, a mobile device may receive anywhere from several to a few dozen beacons. The access points transmitting the beacon may be of various types operating in accordance with different protocols (e.g., Wi-Fi, base station, Bluetooth). The subset of access points that are reported may be selected in any suitable manner. For instance, the mobile device may only report a limited number (e.g., one) of access points of a single type. In this way potentially redundant information need not be reported.

As previously mentioned, the location of a mobile communication device can be only determined to within the coverage area of the pertinent access point. However, additional techniques may be used in some implementations to better refine its location. For instance, environmental parameters that are captured by environmental sensor(s) 258 can be used for this purpose. For instance, if a mobile device is or was known to be within the coverage area of a Wi-Fi access point when it records the Wi-Fi beacon ID, the value of an environmental parameter such as ambient temperature may be useful in determining the mobile device is located indoors or outdoors (this is particularly true in cold climate where the distinction between indoor and outdoor temperature can be substantial). As another example, if the mobile phone is located in a car, this may be determined by capturing background noise using the mobile device microphone. In a similar manner, the value of other environmental parameters such as light level, may be used.

Figure 4:
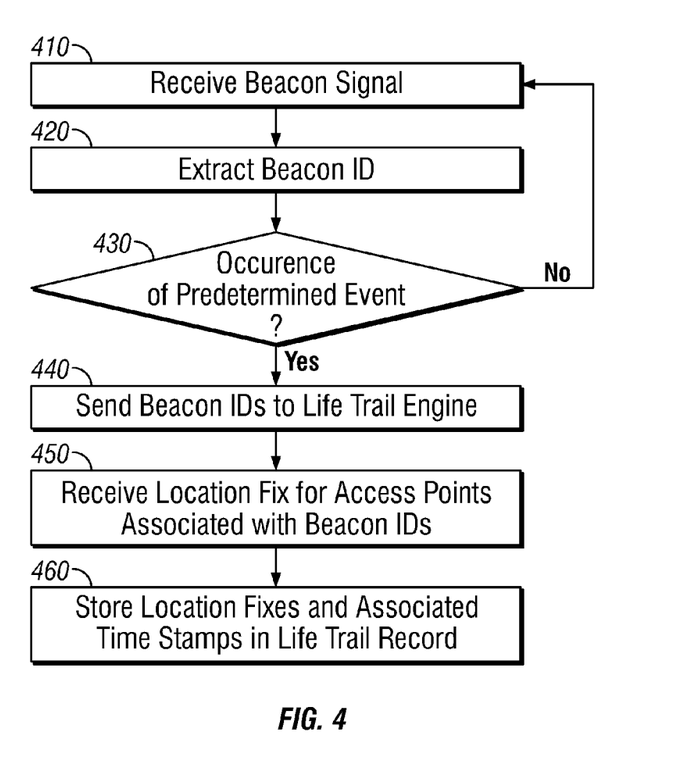
FIG. 4 is a flowchart showing one example of a method for recording a history of locations visited by mobile communication device.
Figure 5:
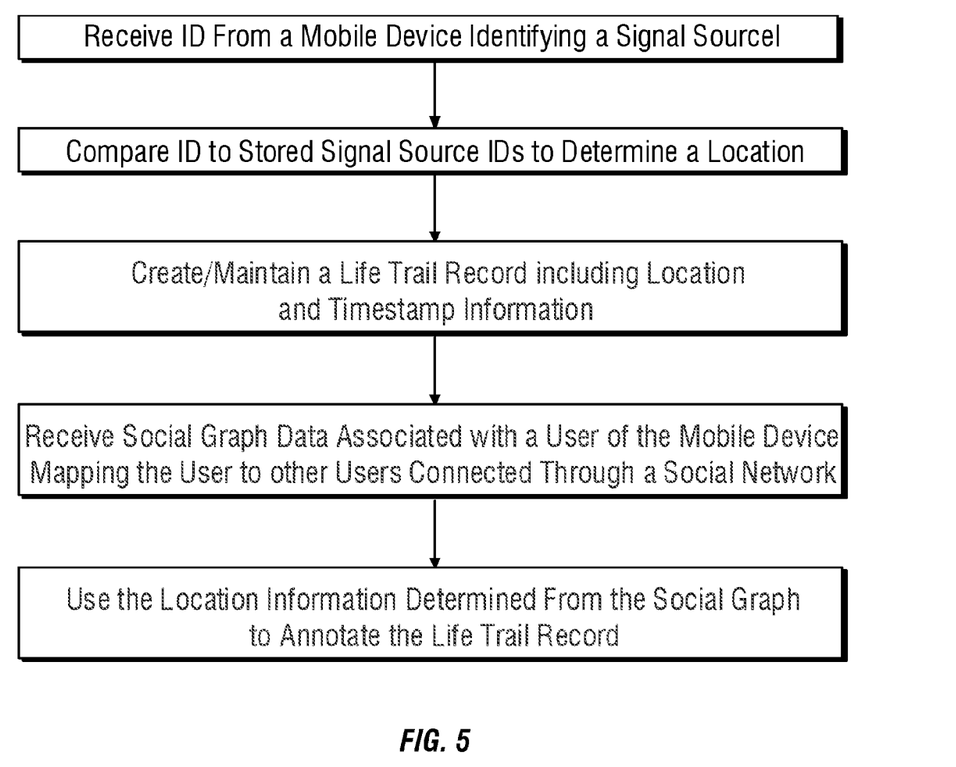
FIG. 5 illustrates a method of recording a history of locations visited by a mobile communication device including obtaining location information through social networks and graphs.

FIG. 4 is a flowchart showing one example of a method for recording a history of locations visited by mobile communication device. The method begins at step 410 when a mobile communication device receives a beacon signal from an access point or other signal source and extracts the beacon ID in step 420. At decision step 430, the mobile device determines whether or not a predetermined event has occurred, which, upon its occurrence, triggers the mobile device to send the beacon to the lifetrail engine over a communication network. In some implementations the predetermined event is selected so as to reduce or conserve power consumption by the mobile communication device. Accordingly, in some implementations the predetermined event may be, for example, receipt of external power from an external power source or receipt of a predetermined number of beacon IDs, which can all be communicated at the same time to the lifetrail engine with greater efficiency in comparison to communicating them immediately upon receipt in different communication sessions. If the predetermined event has not yet occurs, the method returns to step 410 where the mobile device remains until it receives the next beacon signal.

Once the predetermined event of decision step 430 has occurred, the mobile device sends the beacon ID or IDs to the lifetrail engine. The lifetrail engine processes the ID or IDs and, in step 450, the mobile device receives from the lifetrail engine a location fix for the access point associated with each beacon ID, if such location fix is available to it. Finally, in step 460, the mobile device store the location fix or fixes and their associated timestamps as part of a lifetrail record. In this way the lifetrail will be available for use by the user or an application residing on the mobile device.

It should be noted that user information and location information is only collected and stored after notice has been provided to the user that the collection of personal information may occur, for example, when signing up to use the location-based service. The notice will also indicate that this information will not be shared with third parties, other than as may be needed to maintain or enhance the quality of the service that is being provided. Other policies that are intended to protect the user's privacy and enhance the quality of the user experience may also be employed. Once the user is informed as to the terms of service, the user will be given an opportunity to consent to the terms of service.

Because the location-engine stores and provides access to sometimes sensitive personal information of a user to a network of people, certain security and privacy measures are included to allow the user to control who has access to this information. Through a privacy preference utility, the user can define which characteristics the user can share with others within his or her social network, and set filters to limit access of certain information to only certain users. For example, the user can specify which user or group of users within the network can see the location of the user by defining a "whitelist" of users who are allowed to see the location information. User characteristics whose access may be limited can include the user's location information as well as profile and network interaction information. Some of the security functions include the ability to turn off the location sharing so that the location of the mobile device cannot be determined by other mobile device users. The location sharing on/off feature can be triggered through the website, a mobile application, a customer service call, or via a mobile communication device message, or the like. If the mobile communication device is lost or otherwise compromised, the user can disable access to the service by expiring the session id and wipe all information from the device by means of an appropriate message or signal to the device.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of recording a history of locations visited by a mobile communication device, comprising:
   for each of a plurality of locations visited by the mobile communication device, while being located within a coverage area served by at least one signal source, wirelessly receiving a beacon signal from a plurality of signal sources having overlapping coverage areas and extracting a plurality of beacon IDs therefrom;
   selecting a subset of the plurality of beacon IDs to be transmitted to a server;
   upon occurrence of a predetermined event, transmitting the subset of the plurality of beacon IDs and timestamps associated therewith to the server; and
   receiving from the server a location fix of each of the signal sources identified by the beacon IDs that have been obtained, said mobile communication device being located within a region surrounding the location fix equal to the coverage area,
      wherein the subset of the plurality of beacon IDs is selected so that each signal source identified by a beacon ID in the subset operates in accordance with a different protocol.

2. The method of claim 1 further comprising storing each of the location fixes in a record that includes a history of previous locations visited by a mobile communication device as determined from locations of signal sources with which the mobile communication device has previously been in communication, said history of previous locations further including timestamps associated with the previous locations.

3. The method of claim 1 in which the predetermined event is selected to reduce power consumption by the mobile communication device in comparison to transmitting each of the IDs immediately upon receipt thereof.

4. The method of claim 1 in which the beacon ID is obtained by actively scanning for the beacon signal, the beacon ID being obtained when actively scanning for a purpose in addition to determining a current location.

5. The method of claim 4 wherein the purpose in addition to determining the current location is to gain access to a wireless network served by the signal source.

6. The method of claim 1 in which the predetermined event is receipt of a predetermined number of IDs and further comprising transmitting each of the IDs to the server after the predetermined number of IDs are received.

7. The method of claim 1 in which the predetermined event is receipt of external power and further comprising transmitting each of the subset of the plurality of beacon IDs to the server when the mobile communication device is connected to an external power source.

8. A server for determining a plurality of locations visited by a mobile communication device, comprising:
   a locator component configured to receive from the mobile communication device over a communication network a plurality of IDs each identifying at least one signal source having a coverage area in which the mobile communication device is currently or was previously located and a timestamp associated with each of the plurality of IDs;
   a signal source reference database configured to store a plurality of signal source IDs associated with a respective location of said signal sources;
   a lifetrail database for storing a lifetrail record associated with the mobile communication device, said lifetrail record including a history of locations and timestamps associated therewith previously visited by the mobile communication device; and
   computer-implemented processing logic to compare each of the plurality of IDs received from the mobile communication device to the signal source IDs stored in the signal source reference database, and if a match is found, adding the matching location and timestamp associated therewith to the lifetrail record associated with the mobile communication device,
      wherein the locator component is further configured to receive the social graph data associated with a user of the mobile communication device,
      wherein the social graph data maps the user to other users to which the user is connected through a social network,
      at least one of the locations of one of said signal sources included in the signal source reference database being determined from social graph data received by the locator component, and
      wherein the location information determined from the social graph data is used to annotate the lifetrail record of the mobile communication device.

9. The server of claim 8 in which the signal source reference database further includes at least one signal source ID whose location is unknown and said locator component is further configured to receive from the mobile communication device said at least one signal source ID and the location of said at least one signal source ID so that the lifetrail database can be updated to store an association between said at least one signal source ID and the location of said at least one signal source ID.

10. The server of claim 8 further comprising a map builder configured to construct one or more heat maps which show a frequency with which one or more user activities associated with usage of the mobile communication device occur at various locations.

11. One or more computer-readable memory devices, containing instructions which, when executed by one or more processors perform a method for recording a history of locations visited by a mobile communication device comprising the steps of:
   for each of a plurality of locations visited by the mobile communication device, receiving over a communications network an ID identifying at least one signal source while being located within a coverage area served by the at least one signal source;
   resolving each of the IDs identifying at least one signal source to determine a location of a corresponding signal source; and
   creating a lifetrail record associated with the mobile communication device, said lifetrail record including a history of previous locations visited by the mobile communication device as determined from locations of signal sources identified by the IDs that have been received from the mobile communication device,
      wherein resolving each of the IDs includes resolving at least one of the IDs from social graph data received from a social network, wherein the social graph data maps a user to other users to which the user is connected through the social network, and
      wherein location information determined from the social graph data is used to annotate the lifetrail record associated with the mobile communication device.

12. The one or more memory devices of claim 11 further comprising sending the lifetrail record to the mobile communication device over the communication network.

13. The one or more memory devices of claim 11 further comprising;
   receiving a value for an environmental parameter captured by the mobile communication device; and
   refining a location of the mobile communication device within a coverage area of one of the signal sources using the environmental parameter.

14. The one or more memory devices of claim 13 in which the environmental parameter is selected from a group consisting of ambient temperature, ambient light and ambient sound.

15. The one or more memory devices of claim 11 in which the location of the respective signal sources is specified in accordance with a spatial compression technique.

* * * * *